US011649729B2

(12) United States Patent
Giannakopoulos et al.

(10) Patent No.: US 11,649,729 B2
(45) Date of Patent: *May 16, 2023

(54) ANTI-VORTEX TUBE RETAINING RING AND BORE BASKET

(71) Applicant: Raytheon Technologies Corporation, Farmington, CT (US)

(72) Inventors: Konstantinos Panagiotis Giannakopoulos, Middletown, CT (US); Matthew E. Bintz, West Hartford, CT (US); Jashandeep Singh, Allen, TX (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,190

(22) Filed: Aug. 11, 2022

(65) Prior Publication Data

US 2022/0389820 A1    Dec. 8, 2022

Related U.S. Application Data

(63) Continuation of application No. 17/024,034, filed on Sep. 17, 2020, now Pat. No. 11,414,995.

(51) Int. Cl.
*F01D 5/08*     (2006.01)
*B33Y 80/00*    (2015.01)

(52) U.S. Cl.
CPC .............. *F01D 5/087* (2013.01); *B33Y 80/00* (2014.12); *F05D 2220/32* (2013.01); *F05D 2230/31* (2013.01); *F05D 2260/30* (2013.01)

(58) Field of Classification Search
CPC ................................ F01D 5/08–088
See application file for complete search history.

(56) References Cited

U.S. PATENT DOCUMENTS

| 3,844,110 A | 10/1974 | Widlansky et al. |
| 5,700,130 A | 12/1997 | Barbot et al. |
| 7,344,354 B2 | 3/2008 | Lammas et al. |

(Continued)

FOREIGN PATENT DOCUMENTS

| CN | 105114357 A | * 12/2015 |
| CN | 107023394 B | 3/2019 |

(Continued)

OTHER PUBLICATIONS

Search Report Issued in European Patent Application No. 21197183.3; Application Filing Date Sep. 16, 2021; dated Feb. 23, 2022 (8 pages).

*Primary Examiner* — Topaz L. Elliott
(74) *Attorney, Agent, or Firm* — Cantor Colburn LLP (57) ABSTRACT

An anti-vortex tube (AVT) retaining ring and bore basket is provided and includes a unitary body having an inboard portion, an outboard portion and an intermediate portion. The inboard portion includes a first ring-shaped body with an outer diameter. The outboard portion is configured to support an array of AVTs and includes a second ring-shaped body with an inner diameter larger than the outer diameter of the first ring-shaped body. The intermediate portion includes a flange extending between the outer and inner diameters of the first and second ring-shaped bodies, respectively.

19 Claims, 4 Drawing Sheets

(56) References Cited

U.S. PATENT DOCUMENTS

| | | |
|---|---|---|
| 10,280,792 B2 | 5/2019 | Gons |
| 10,563,672 B2 | 2/2020 | Giannakopoulos et al. |
| 2005/0172640 A1 | 8/2005 | Drevs et al. |
| 2007/0053770 A1 | 3/2007 | Lammas et al. |
| 2015/0240723 A1 | 8/2015 | Gons |
| 2016/0265371 A1 | 9/2016 | Dale et al. |
| 2019/0242407 A1 | 8/2019 | Giannakopoulos et al. |

FOREIGN PATENT DOCUMENTS

| | | | |
|---|---|---|---|
| EP | 2617941 A1 | 7/2013 | |
| EP | 2910735 A1 * | 8/2015 | ............. F01D 25/12 |
| EP | 3543539 A1 | 9/2019 | |

\* cited by examiner

ANTI-VORTEX TUBE RETAINING RING AND BORE BASKET

CROSS-REFERENCE TO RELATED APPLICATIONS

This application is a continuation of U.S. application Ser. No. 17/024,034 filed Sep. 17, 2020, the contents of which are hereby incorporated by reference in its entirety.

BACKGROUND

Exemplary embodiments of the present disclosure relate generally to gas turbine engines and, in one embodiment, to a hybridized anti-vortex tube (AVT) retaining ring and bore basket.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotations of a propeller or to produce electricity in a generator.

Within certain stages of the compressor, anti-vortex tubes (AVTs) are used to control airflows in front or forward compressor sections and in rear or aft compressor sections. In each case, the tubes are oriented radially and arranged in circumferential arrays and are typically held in place by complicated parts with multiple components. Assembling these complicated parts and installing them in compressors is time consuming and costly and the complicated parts themselves can be prone to wear between mating surfaces and can potentially produce foreign object debris (FOD).

Accordingly, a need exists for an AVT retaining ring and bore basket with a reduced number of components, assembly time and cost that will not present a risk of production of FOD.

BRIEF DESCRIPTION

According to an aspect of the disclosure, an anti-vortex tube (AVT) retaining ring and bore basket is provided and includes a unitary body having an inboard portion, an outboard portion and an intermediate portion. The inboard portion includes a first ring-shaped body with an outer diameter. The outboard portion is configured to support an array of AVTs and includes a second ring-shaped body with an inner diameter larger than the outer diameter of the first ring-shaped body. The intermediate portion includes a flange extending between the outer and inner diameters of the first and second ring-shaped bodies, respectively.

In accordance with additional or alternative embodiments, the unitary body is additively manufactured.

In accordance with additional or alternative embodiments, the array of AVTs is arranged circumferentially and each AVT of the array of AVTs is oriented radially.

In accordance with additional or alternative embodiments, the unitary body is configured for installation within one of front and rear blocks of a gas turbine engine compressor.

In accordance with additional or alternative embodiments, the inboard portion is configured for engagement with an inner diameter of the one of the front and rear blocks of the gas turbine engine compressor and the outboard portion is configured for engagement with a boss of the one of the front and rear blocks of the gas turbine engine compressor.

In accordance with additional or alternative embodiments, the second ring-shaped body defines an array of through-holes through which the AVTs extend and includes a protrusion to support the AVTs.

In accordance with additional or alternative embodiments, the first ring-shaped body defines an airflow pathway, an outlet thereof and an inlet thereof.

According to an aspect of the disclosure, an anti-vortex tube (AVT) retaining ring and bore basket for a front block of a gas turbine compressor is provided and includes a unitary body having an inboard portion, an outboard portion and an intermediate portion. The inboard portion is engageable with an inner diameter of the front block and includes a first ring-shaped body with an outer diameter. The outboard portion is engageable with a boss of the front block and to support an array of AVTs and includes a second ring-shaped body with an inner diameter larger than the outer diameter of the first ring-shaped body. The intermediate portion includes a flange extending between the outer and inner diameters of the first and second ring-shaped bodies, respectively.

In accordance with additional or alternative embodiments, the unitary body is additively manufactured.

In accordance with additional or alternative embodiments, the array of AVTs is arranged circumferentially and each AVT of the array of AVTs is oriented radially.

In accordance with additional or alternative embodiments, the first ring-shaped body is disposable inside inboard ends of bores of rotors of forward-most stages of the front block.

In accordance with additional or alternative embodiments, the second ring-shaped body and the flange are disposed between lower webs of rotors of aft stages of the front block.

In accordance with additional or alternative embodiments, the second ring-shaped body defines an array of through-holes through which the AVTs extend and includes a protrusion to support the AVTs and the first ring-shaped body defines an airflow pathway, which is fluidly communicative with an opening in the front block, an outlet thereof and an inlet thereof which is aft of the outlet.

In accordance with additional or alternative embodiments, the airflow pathway extends inside inboard ends of bores of rotors of at least forward-most stages of the front block.

According to an aspect of the disclosure, an anti-vortex tube (AVT) retaining ring and bore basket for a rear block of a gas turbine compressor is provided and includes a unitary body having an inboard portion, an outboard portion and an intermediate portion. The inboard portion is engageable with an inner diameter of the rear block and includes a first ring-shaped body with an outer diameter. The outboard portion is engageable with a boss of the rear block and to support an array of AVTs and includes a second ring-shaped body with an inner diameter larger than the outer diameter of the first ring-shaped body. The intermediate portion includes a flange extending between the outer and inner diameters of the first and second ring-shaped bodies, respectively.

In accordance with additional or alternative embodiments, the unitary body is additively manufactured.

In accordance with additional or alternative embodiments, the array of AVTs is arranged circumferentially and each AVT of the array of AVTs is oriented radially.

In accordance with additional or alternative embodiments, the first ring-shaped body is disposable inside inboard ends of bores of rotors of aft-most stages of the rear block.

In accordance with additional or alternative embodiments, the second ring-shaped body and the flange are disposed between lower webs of rotors of forward stages of the rear block.

In accordance with additional or alternative embodiments, the second ring-shaped body defines an array of through-holes through which the AVTs extend and includes a protrusion to support the AVTs.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
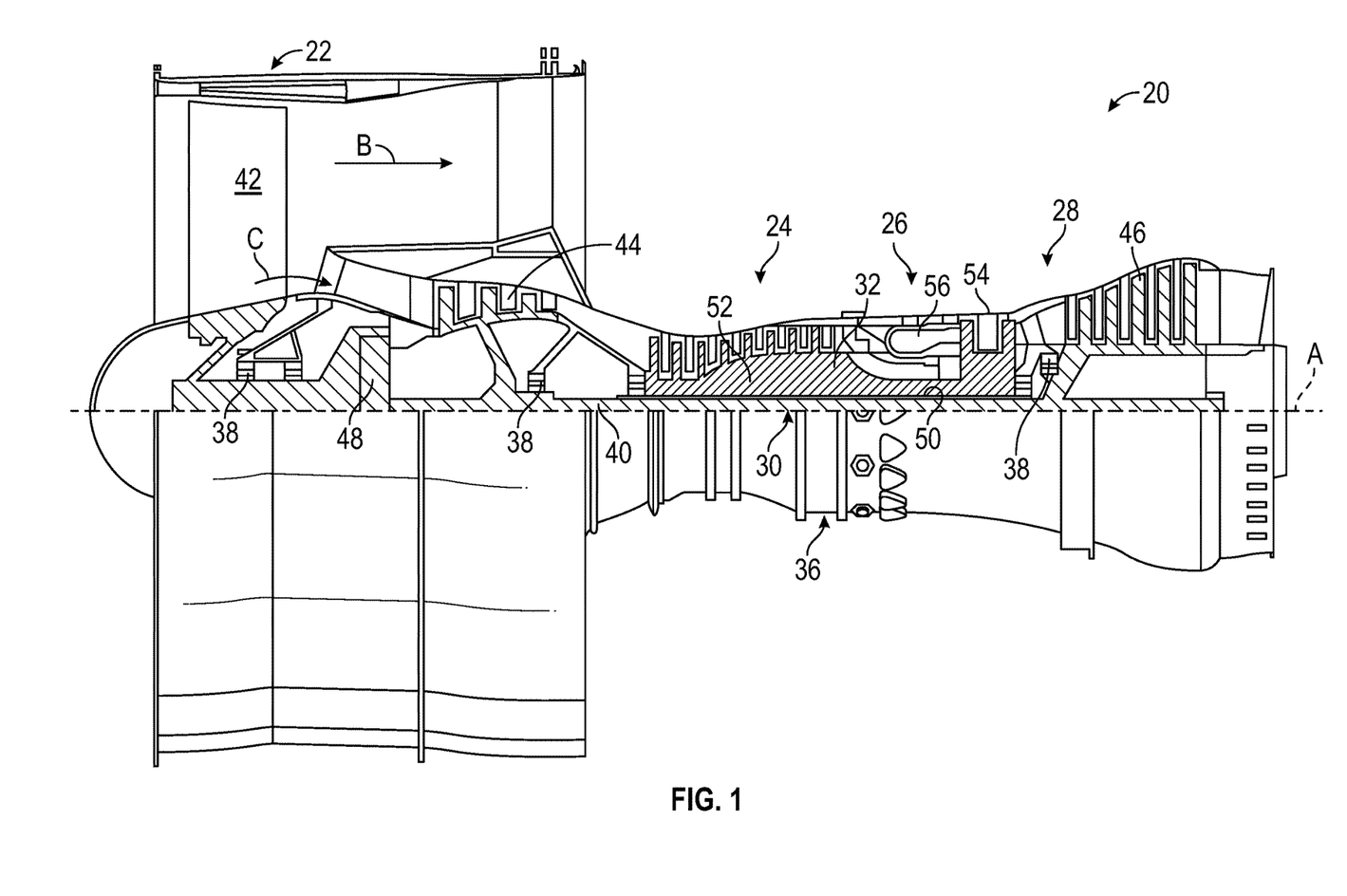
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans and may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system.

As will be described below, an AVT retaining ring and bore basket is provided and has a reduced number of components and a reduced risk of producing FOD as compared to conventional assemblies.

Figure 2:
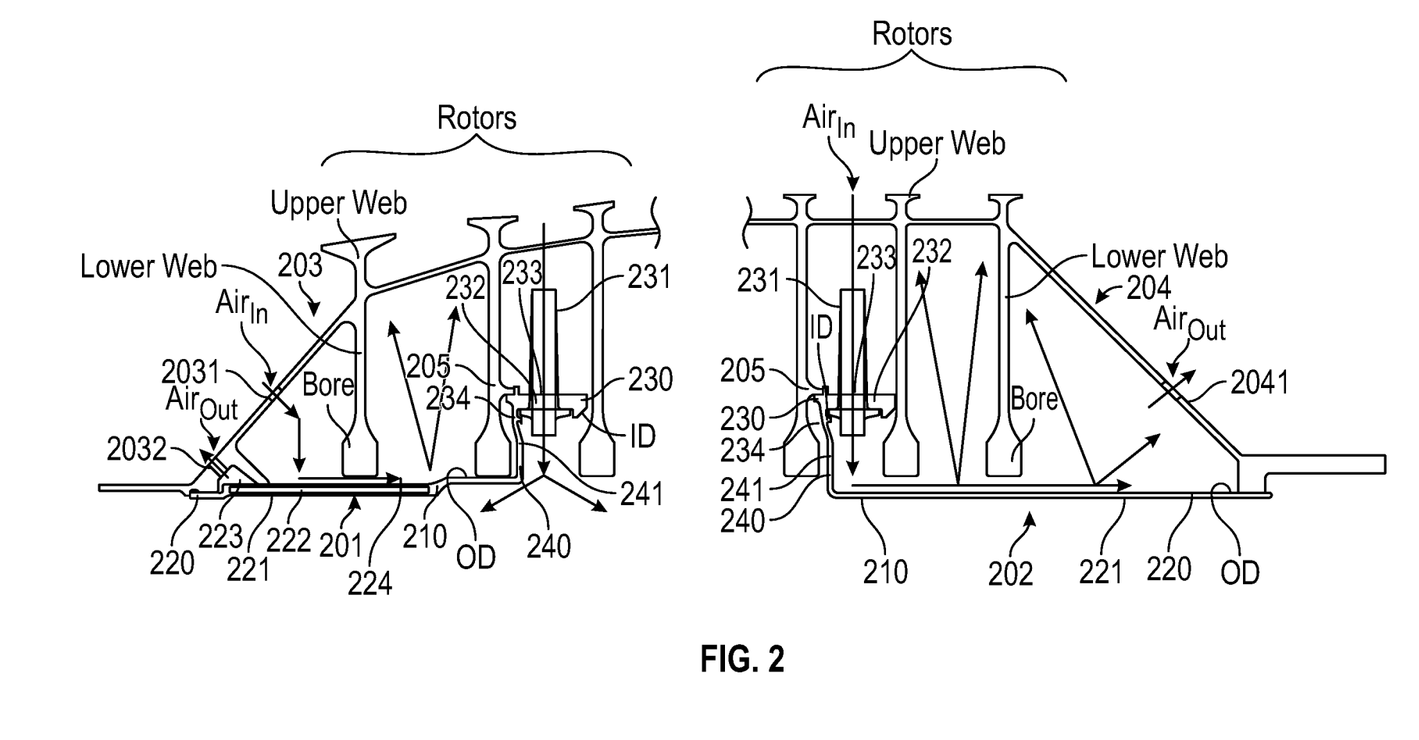
FIG. 2 is a side view of a section of compressor stages of the gas turbine engine of FIG. 1 in accordance with embodiments.

With continued reference to FIG. 1 and with additional reference to FIG. 2, AVT retaining ring and bore baskets 201 and 202 are provided for installation in the front and rear blocks 203 and 204, respectively, of the compressor section 24 of the gas turbine engine 20. Each of the AVT retaining ring and bore baskets 201 and 202 includes a unitary body 210, which has an inboard portion 220, an outboard portion 230 and an intermediate portion 240. The unitary body 210 can be additively manufactured into a single continuous feature or welded together into a single continuous feature. The inboard portion 220 includes a first ring-shaped body 221 with an outer diameter OD. The outboard portion 230 is configured to support an array of AVTs 231 and includes a second ring-shaped body 232 with an inner diameter ID. The inner diameter ID is larger than the outer diameter OD of the first ring-shaped body 221. The array of AVTs 231 is arranged circumferentially and each AVT 231 is oriented to extend along the radial dimension of the gas turbine engine 20. The intermediate portion 240 includes a flange 241 that extends between the outer diameter OD of the first ring-shaped portion 221 and the inner diameter ID of the second ring-shaped body 232.

In accordance with embodiments, while FIG. 2 illustrates that the AVT retaining ring and bore basket 201 is provided for installation in the front block 203 and that the AVT retaining ring and bore basket 202 is provided for installation in the rear block 204, this is not required. For example, the AVT retaining ring and bore basket 201 can be provided for installation in the front block 203 with or without installation of the AVT retaining ring and bore basket 202 in the rear block 204 and the AVT retaining ring and bore basket 202 can be provided for installation in the rear block 204 with or without installation of the AVT retaining ring and bore basket 201 in the front block 203.

In the case of the AVT retaining ring and bore basket 201 being provided for installation in the front block 203, the inboard portion 220 is configured for engagement with an inner diameter of the front block 203 of the compressor section 24 of the gas turbine engine 20 and the outboard portion 230 is configured for engagement with a boss 205 of the front block 203 of the compressor section 24 of the gas turbine engine 20. In the case of the AVT retaining ring and bore basket 202 being provided for installation in the rear block 204, the inboard portion 220 is configured for engagement with an inner diameter of the rear block 204 of the compressor section 24 of the gas turbine engine 20 and the outboard portion 230 is configured for engagement with a boss 205 of the rear block 204 of the compressor section 24 of the gas turbine engine 20.

In the case of the AVT retaining ring and bore basket 201 being provided for installation in the front block 203, the second ring-shaped body 232 defines an array of through-holes 233 through which the AVTs 231 extend and includes a protrusion 234 to support the AVTs 231 and the first ring-shaped body 221 defines an airflow pathway 222, an outlet 223 thereof and an inlet 224 thereof. During operational conditions, airflows proceed through the front block 203 via inlet 2031 and aft between lower webs of the rotors of the forward-most stages of the front block 203 and the first ring-shaped body 221. In doing so, the airflows occupy space between the lower webs. Eventually, the airflows proceed into the airflow pathway 222 via the inlet 224 and leave the airflow pathway 222 via the outlet 223 before proceeding through the front block 203 via outlet 2032. Additional airflows flow inwardly through the AVTs 231.

In the case of the AVT retaining ring and bore basket 202 being provided for installation in the rear block 204, the second ring-shaped body 232 defines the array of through-holes 233 through which the AVTs 231 extend and includes the protrusion 234 to support the AVTs 231. During operational conditions, airflows proceed inwardly through the AVTs 231 and aft between lower webs of the rotors of the aft-most stages of the rear block 204 and the first ring-shaped body 221. In doing so, the airflows occupy space between the lower webs. Eventually, the airflows proceed through the rear block 204 via outlet 2041.

Figure 3:
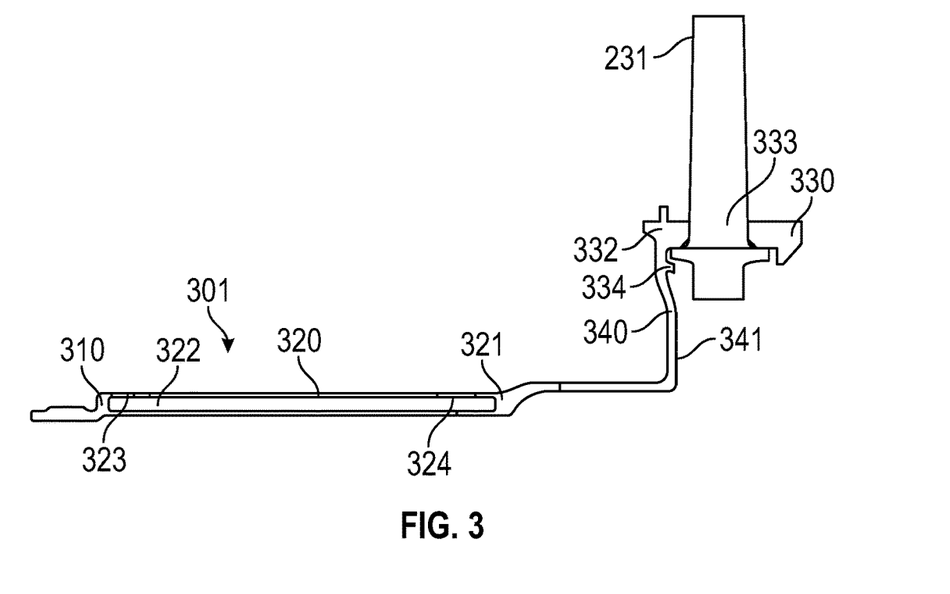
FIG. 3 is a side view of an AVT retaining ring and bore basket for a front block in accordance with embodiments.
Figure 4:
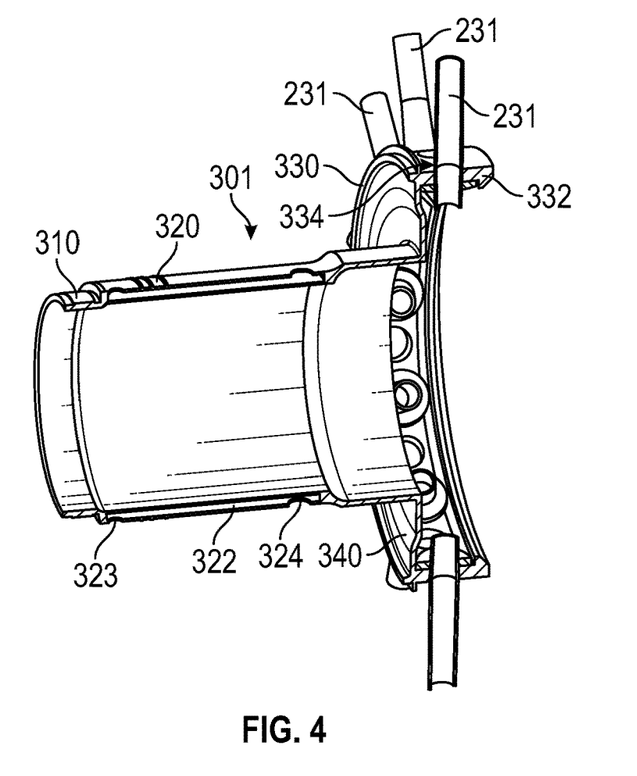
FIG. 4 is a partial perspective view of the AVT retaining ring and bore basket of FIG. 3.

With reference to FIGS. 3 and 4, an AVT retaining ring and bore basket 301 is provided for a front block 02 of the compressor section 24 of the gas turbine engine 20 of FIGS. 1 and 2. The AVT retaining ring and bore basket 301 is similar to the AVT retaining ring and bore basket 201 and like elements need not be described in further detail but to note that the AVT retaining ring and bore basket 301 includes a unitary body 310, which can be additively manufactured or welded and which has an inboard portion 320 that includes a first ring-shaped body 321, an outboard portion 330 that is engageable with a boss of the front block and includes a second ring-shaped body 332 and an intermediate portion 340 that includes a flange 341 extending between the first ring-shaped portion 321 and the second ring-shaped body 332. The first ring-shaped body 321 is disposable inside inboard ends of bores of rotors of forward-most stages of the front block and the second ring-shaped body 332 and the flange 341 are disposed between lower webs of aft stages of the front block. The second ring-shaped body 332 defines an array of through-holes 333 through which the AVTs extend and includes a protrusion 334 to support the AVTs. The first ring-shaped body 321 defines an airflow pathway 322, an outlet 323 thereof and an inlet 324 thereof which is aft of the outlet 323.

Figure 5:
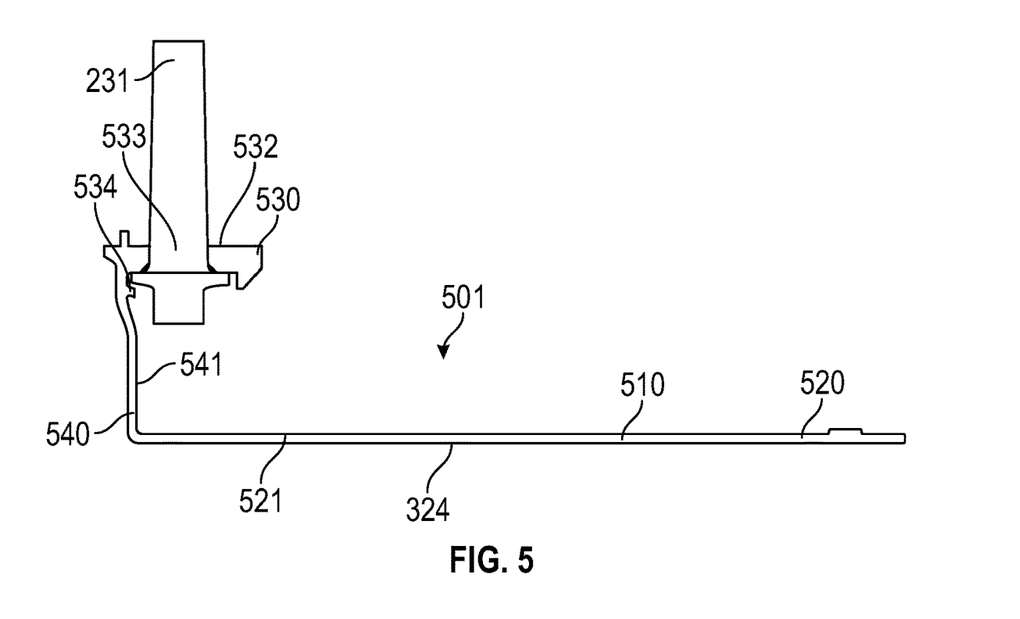
FIG. 5 is a side view of an AVT retaining ring and bore basket for a rear block in accordance with embodiments.
Figure 6:
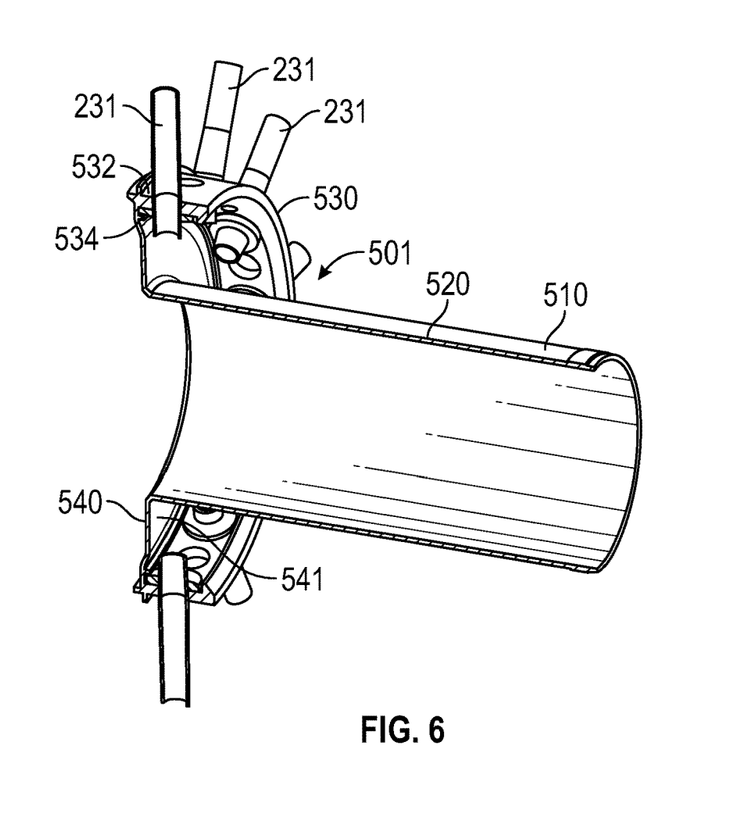
FIG. 6 is a partial perspective view of the AVT retaining ring and bore basket of FIG. 5.

With reference to FIGS. 5 and 6, an AVT retaining ring and bore basket 501 is provided for a rear block of the compressor section 24 of the gas turbine engine 20 of FIGS. 1 and 2. The AVT retaining ring and bore basket 501 is similar to the AVT retaining ring and bore basket 202 and like elements need not be described in further detail but to note that the AVT retaining ring and bore basket 501 includes a unitary body 510, which can be additively manufactured or welded and which has an inboard portion 520 that includes a first ring-shaped body 521, an outboard portion 530 that is engageable with a boss of the rear block and includes a second ring-shaped body 532 and an intermediate portion 540 that includes a flange 541 extending between the first ring-shaped portion 521 and the second ring-shaped body 532. The first ring-shaped body 521 is disposable inside inboard ends of bores of rotors of aft-most stages of the rear block and the second ring-shaped body 532 and the flange 541 are disposed between lower webs of forward stages of the rear block. The second ring-shaped body 532 defines an array of through-holes 533 through which the AVTs extend and includes a protrusion 534 to support the AVTs.

Benefits of the features described herein are the provision of an AVT retaining ring and bore basket that has a reduced number of components and a reduced risk of producing FOD as compared to conventional assemblies.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An anti-vortex tube (AVT) retaining ring and bore basket, comprising:
    a unitary body having an inboard portion, an outboard portion and an intermediate portion,
    the inboard portion comprising a first ring-shaped body with an outer diameter,
    the outboard portion being configured to support AVTs and comprising a second ring-shaped body with an inner diameter larger than the outer diameter, and
    the intermediate portion comprising a flange extending between the the first and second ring-shaped bodies,
    wherein the second ring-shaped body defines through-holes through which the AVTs extend and comprises a protrusion for AVT support, and
    wherein the outboard portion is configured for simultaneous engagement with two surfaces of a boss of the front or rear block.

2. The AVT retaining ring and bore basket according to claim 1, wherein the unitary body is additively manufactured.

3. The AVT retaining ring and bore basket according to claim 1, wherein the AVTs are arranged circumferentially and oriented radially.

4. The AVT retaining ring and bore basket according to claim 1, wherein:
    the unitary body is configured for installation within a front block of a compressor, and
    the outboard portion is configured for engagement with a boss of the front block.

5. The AVT retaining ring and bore basket according to claim 1, wherein:
    the unitary body is configured for installation within a rear block of a compressor, and
    the outboard portion is configured for engagement with a boss of the rear block.

6. The AVT retaining ring and bore basket according to claim 1, wherein an axial end of the outboard portion opposite the intermediate portion is axially aligned with a point on the inboard portion.

7. The AVT retaining ring and bore basket according to claim 1, wherein the first ring-shaped body defines an airflow pathway, an outlet thereof and an inlet thereof.

8. An anti-vortex tube (AVT) retaining ring and bore basket for a front block of a compressor and comprising:
    a unitary body having an inboard portion, an outboard portion and an intermediate portion,
    the inboard portion engageable with an inner diameter of the front block and comprising a first ring-shaped body with an outer diameter,
    the outboard portion configured to simultaneously engage with two surfaces of a boss of the front block and configured to support AVTs and comprising a second ring-shaped body with an inner diameter larger than the outer diameter, and
    the intermediate portion comprising a flange extending between the first and second ring-shaped bodies,
    wherein the second ring-shaped body defines through-holes through which the AVTs extend and comprises an AVT support protrusion.

9. The AVT retaining ring and bore basket according to claim 8, wherein the unitary body is additively manufactured.

10. The AVT retaining ring and bore basket according to claim 8, wherein the AVTs are arranged circumferentially and oriented radially.

11. The AVT retaining ring and bore basket according to claim 8, wherein the first ring-shaped body is disposable inside inboard ends of bores of rotors of forward-most stages of the front block.

12. The AVT retaining ring and bore basket according to claim 8, wherein the second ring-shaped body and the flange are disposable between lower webs of rotors of aft stages of the front block.

13. The AVT retaining ring and bore basket according to claim 8, wherein the first ring-shaped body defines an airflow pathway, which is configured to be fluidly communicative with an opening in the front block, an outlet thereof and an inlet thereof which is aft of the outlet.

14. The AVT retaining ring and bore basket according to claim 13, wherein, in an installed state of the retaining ring and bore basket, the airflow pathway extends inside inboard ends of bores of rotors of at least forward-most stages of the front block.

15. An anti-vortex tube (AVT) retaining ring and bore basket for a rear block of a compressor and comprising:
    a unitary body having an inboard portion, an outboard portion and an intermediate portion,
    the inboard portion engageable with an inner diameter of the rear block and comprising a first ring-shaped body with an outer diameter,
    the outboard portion configured to simultaneously engage with two surfaces of a boss of the rear block and configured to support AVTs and comprising a second ring-shaped body with an inner diameter larger than the outer diameter, and
    the intermediate portion comprising a flange extending between the first and second ring-shaped bodies,
    wherein the second ring-shaped body defines through-holes through which the AVTs extend and comprises an AVT support protrusion.

16. The AVT retaining ring and bore basket according to claim 15, wherein the unitary body is additively manufactured.

17. The AVT retaining ring and bore basket according to claim 15, wherein the AVTs are arranged circumferentially and oriented radially.

18. The AVT retaining ring and bore basket according to claim 15, wherein the first ring-shaped body is disposable inside inboard ends of bores of rotors of aft-most stages of the rear block.

19. The AVT retaining ring and bore basket according to claim 15, wherein the second ring-shaped body and the flange are disposable between lower webs of rotors of forward stages of the rear block.

* * * * *